United States Patent [19]

Gitlin

[11] 4,320,526

[45] Mar. 16, 1982

[54] ADAPTIVE PHASE-JITTER TRACKER

[75] Inventor: Richard D. Gitlin, Monmouth Beach, N.J.

[73] Assignee: Bell Telephone Laboratories, Incorporated, Murray Hill, N.J.

[21] Appl. No.: 126,410

[22] Filed: Mar. 3, 1980

[51] Int. Cl.$^3$ ............................................. H04B 1/10
[52] U.S. Cl. ...................................... 375/118; 375/14; 370/79; 333/18
[58] Field of Search ....................... 375/11, 12, 14, 15, 375/118, 34, 57, 96, 99, 101, 111, 106; 333/18; 370/6, 79; 371/41, 42, 64

[56] References Cited

U.S. PATENT DOCUMENTS

| | | | |
|---|---|---|---|
| 3,878,468 | 4/1975 | Falconer | 375/15 |
| 3,935,535 | 1/1976 | Motley | 375/15 |
| 3,943,448 | 3/1976 | Motley | 375/14 |
| 4,021,738 | 5/1977 | Gitlin | 375/14 |
| 4,061,977 | 12/1977 | Motley | 375/118 |
| 4,061,978 | 12/1977 | Motley | 375/15 |

OTHER PUBLICATIONS

Bell System Technical Journal vol. 55, No. 3, Mar. 1976, Jointly Adaptive Equalization and Carrier Recovery in Two Dimensional Digital Communication System DD Falconer, pp. 317–334.

Primary Examiner—Benedict V. Safourek
Assistant Examiner—Stephen Chin
Attorney, Agent, or Firm—John Francis Moran

[57] ABSTRACT

An adaptive phase-jitter compensator, which is frequency selective, is disclosed for use in data receivers. The filter section (28) of the adaptive compensator receives a derived phase error signal and its own weighted sum output to provide the difference between them as selective noisy estimates of the actual phase via taps of a delay line (52-1 to 52-L). A multiplier (57) accepts each tap signal and the phase error to form a product used to update the coefficients or tap weights used in the filter section. An upmodulator (29) impresses the weighted sum output on a carrier signal whose output is used by a lookup table (31) to form components to be compatible with the received data signal. A complex multiplier, (23), multiplies the components and the data signal which has been previously split into components and equalized, to provide both demodulation and phase-jitter compensation.

7 Claims, 3 Drawing Figures

ADAPTIVE PHASE-JITTER TRACKER

TECHNICAL FIELD

This invention relates to the correction of distortion and/or impairments experienced by digital data signals during transmission over existing media of limited frequency bandwidth. In particular, the invention relates to the adaptive control of frequency-selective phase compensators in any linearly modulated system, for example, phase-modulated (PM) and quadrature amplitude-modulated (QAM) data transmission systems.

BACKGROUND OF THE INVENTION

Efficient digital data utilization of limited frequency band channels ordinarily used for telephone voice transmission is accomplished by multilevel high speed signals, making possible, for example, transmission at 9600 bits per second. Low error rates, however, can only be achieved by effective compensation of signal degradation otherwise highly destructive to data signals. This degradation, which is produced by typical transmission channels, is widely tolerated since it is innocuous to voice transmission. Linear distortion due to variations in the attenuation and the delay imparted to different frequency components produces a dispersion effect, which degrades the transmission signal, commonly known as intersymbol interference. Transversal filters are generally used to implement adaptive equalizers, which are an effective means of compensating for intersymbol interference.

In addition to linear distortion, there are also carrier-phase perturbation effects which are harmful to digital data signals. One source for such effects is the frequency-translation oscillator of a frequency division multiplex (FDM) channel bank. The low-level, but omnipresent, power supply ripple in these oscillators contributes phase-jitter to the digital data signal at the fundamental and other low-order harmonic frequencies of the AC power frequency. Other sources of carrier phase perturbation are random fluctuations of carrier phase, incidental FM, and/or phase jitter. As a result, the spectral components of the phase-jitter encountered in transmission systems may range anywhere from the harmonics of the AC power frequency down to almost zero frequency.

In U.S. Pat. No. 3,878,468 issued to D. D. Falconer et al on Apr. 15, 1975, an arrangement utilizing a phase-jitter compensator connected to the output of an equalizer is disclosed for providing jitter-free passband equalization of data signals. This arrangement is an example of what is commonly referred to as a first order data-directed phase-locked loop. The logical extension to achieve a performance advantage, such as for frequency offsets, would be to utilize a second order phase-locked loop. For both orders of these conventional data-directed loops, the parameters are intrinsically fixed and selected to achieve a compromise between a bandwidth wide enough to track the highest frequency jitter and yet not too wide so as to reduce the noise passed to the loop output. Because the presence and degree of phase jitter varies from connection to connection, first and second order phase-locked loops are conservatively designed to track only the lower frequency components of the phase jitter leaving the higher frequency components present to degrade the demodulated signal.

A primary object of this invention is to provide a frequency-selective phase tracker capable of adaptively tuning to the frequency components of carrier phase perturbations while simultaneously minimizing the noise in the estimate.

A related object is to provide a frequency selective phase compensator that has a nonrecursive structure for adaptively minimizing mean-squared angular error in a unimodal fashion.

SUMMARY OF THE INVENTION

The invention takes the form of an adaptive phase tracker to provide frequency selective phase jitter compensation. The adaptive portion of the phase tracker, which includes a signal synthesizing section and a coefficient updating section, operates in response to a phase error derived from the input and output of a decision circuit. Multipliers in the signal synthesizing section are each associated with a tap of a delay line also included in this section. Units in the coefficient updating section are associated with each signal tap to provide the multiplication factor for the corresponding multiplier associated with that tap. Each unit uses an accumulation of a predetermined portion of the product of the phase error and tap signal, which represents a selected noisy estimate of the actual phase, to determine its particular gain factor. The outputs of the multiplier of the signal synthesizing section are added to form a weighted sum which is used to modulate the carrier signal. The modulated signal is used by a complex multiplier to compensate the received data signal by cancelling out the phase-jitter and also concurrently demodulates the data signal to provide a baseband signal for the decision circuit.

In some of the further aspects of the invention, the tapped-delay line is fed with the difference between the weighted sum and the phase error to provide successive selected noisy estimates at its taps. Each unit in the coefficient updating section is provided with tap leakage to prevent possible blow-up of its accumulation of the gain factor. In addition, each unit includes a multiplier connected to receive the tap signal and the phase error signal and means for obtaining a proportion of the product to produce the accumulation for that unit.

BRIEF DESCRIPTION OF THE DRAWING

Features of the invention and additional objects of the invention will be more readily appreciated and better understood by reference to the following detailed description which should be considered in conjunction with the drawing:

FIG. 3 illustrates the manner in which FIGS. 1 and 2 are to be combined for providing a complete data receiver in accordance with the invention.

DETAILED DESCRIPTION

Figure 1:
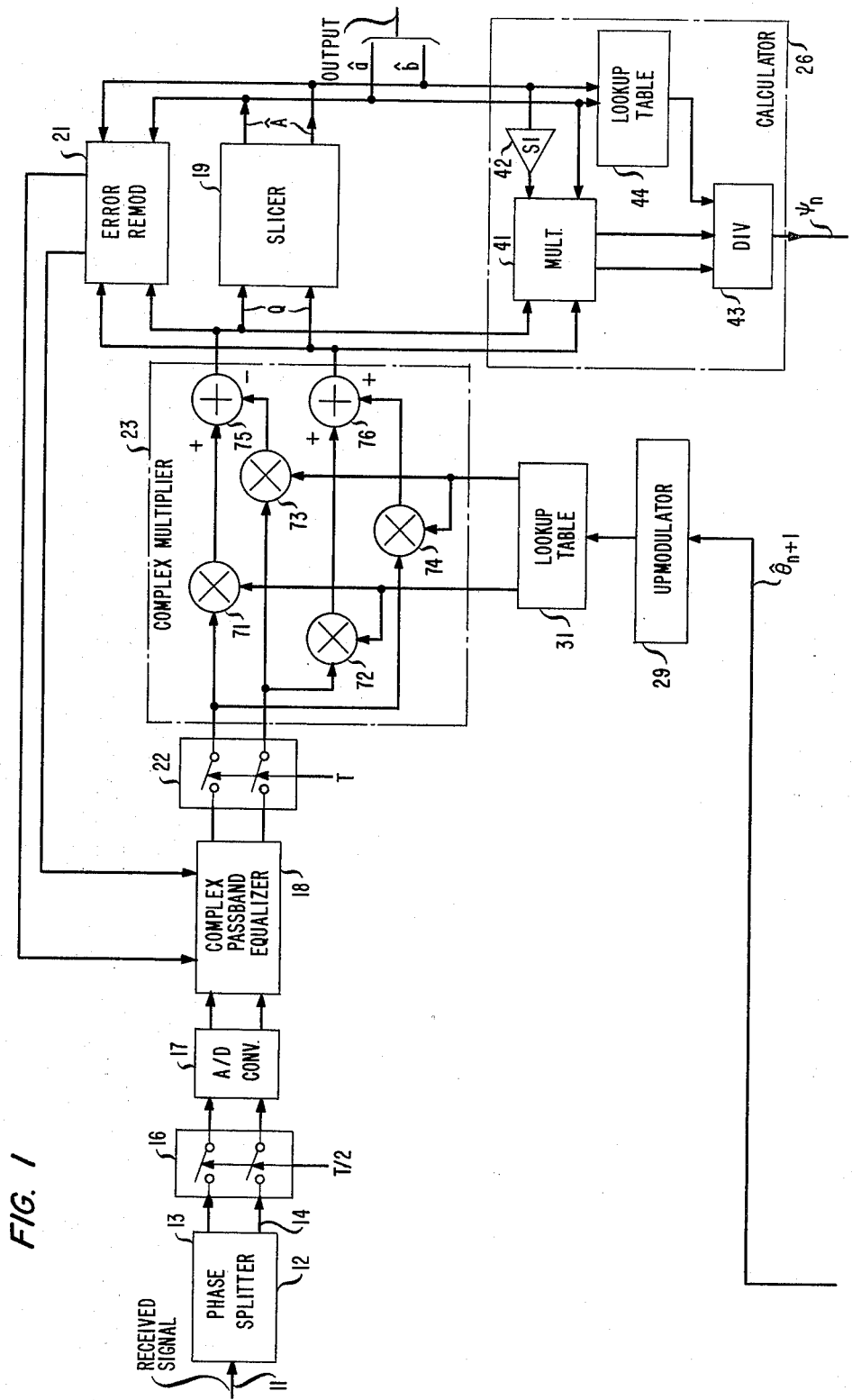
FIG. 1 illustrates a substantial portion of a data receiver utilizing phase jitter compensation to advantage.

The illustrative embodiment of the invention is presented in the context of a quadrature-amplitude modulated (QAM) digital data transmission signal suitable for high-speed telephone voiceband data transmission. The basic signal rate is the reciprocal (1/T) of the baud (symbols per second) interval divided into two orthogonal, i.e., differing by 90 electrical degrees, phases of a common carrier frequency. Typically, the frequency of the carrier is 1800 Hz so that the modulated signals are added together for transmission via a bandlimited or voiceband telephone channel. The data signals applied to each orthogonal carrier phase may be independent, although synchronized and multilevel. As an example, a 4-level (+1, −1, +3, −3) baseband data signal may be applied to each orthogonal carrier phase for an overall binary data rate of 4/T bits per second with a baud of 1/T symbols per second. In other words, four paralleled information bits are transmitted during each symbol interval of duration T=1/2400 seconds. Accordingly, a baud of 2400 symbols per second provides the high-speed data rate of 9600 bits per second.

The combination of multilevel signal and the high sample rate increases the demand on accuracy in recovering the baseband data signal from the transmitted signal which is subject to carrier phase perturbance in addition to linear distortion. As previously mentioned, the latter is adequately compensated by conventional transversal filtering equalization arrangements. However, the phase-jitter is difficult to control and characterize particularly in the case of automatically switched and routed channels. An ideal phase-jitter compensation arrangement must be able to compensate adaptively for the particular type of carrier phase perturbance which develops as each transmission channel is automatically completed. Accordingly, the phase compensator to be described hereinafter has the capability of adaptively synthesizing an extremely narrow-band filter to isolate and estimate the significant components of the phase jitter. Thus, in contrast to prior art tracking loops, this phase tracker is able to reliably estimate phase jitter, while simultaneously minimizing the noise in the estimate.

The analytical basis for the adaptive phase tracker will be provided initially to provide a basis for understanding the operation and advantages of the illustrative embodiment. In accordance with D. D. Falconer's article entitled, "Jointly Adaptive Equalization and Carrier Recovery in Two Dimensional Digital Communication Systems," in the *Bell System Technical Journal*, Vol. 55, No: 3, pp. 317–334, March, 1976, at the nth sampling instant, the passband equalizer output in a high-speed QAM data transmission system may be expressed as $$X(nT) = X_n = x_n + j\hat{x}_n = A_n e^{j\theta_n} + W_n, \quad n=1,2,3, \quad (1)$$

The above model which isolates the effect of phase jitter by assuming that the equalizer has removed all intersymbol interference, will provide the motivation for the adaptive phase-tracking system. In equation (1) the following notation is used:

$A_n = a_n + jb_n$ = complex discrete-valued data symbol ($a_n$ = in-phase data symbol, $b_n$ = quadrature data symbol)

$\theta_n$ = phase jitter sample $W_n$ = independent background noise samples with variance $\sigma_w^2$ $X_n = x_n + j\hat{x}_n$ = passband equalizer output sample ($x_n$ = in-phase output, $\hat{x}_n$ = quadrature output where the symbol ∨ denotes the Hilbert Transform), and as will be apparent from FIG. 1 the equalizer output is sampled at the symbol rate of once every T seconds. Note that the known portion of the carrier phase advance, $\omega_c T$, is presumed removed (via complex multiplication by $e^{-j\omega_c T}$—where complex multiplication will be described in the sequel) in the above discussion, where $\omega_c$ denotes the radian carrier frequency. This removal is commonly called demodulation. The oversimplified intersymbol-interference free model of equation (1) is reasonably accurate wherever a single phase angle can be associated with the equalizer output sample. This cannot be done when either the channel has so much dispersion, or the phase jitter has such high frequency content, that the phase angle varies considerably across the duration of the significant equalizer tap weights. If we restrict attention to those situations where equation (1) is valid, then the task of the phase canceller is to estimate $\theta_n$, by $\hat{\theta}_n$, and to then form the demodulated output $$Q_n = X_n e^{-j\hat{\theta}_n} = A_n e^{-j(\hat{\theta}_n - \theta_n)} + W_n e^{-j\hat{\theta}_n} \quad (2)$$

The demodulated output is then quantized to provide the decision $\hat{A}_n$. If the noise power is small, relative to $\langle |A_n|^2 \rangle$ with the brackets denoting the expected value, then the demodulated output will be a rotated version of the data symbol. Presuming the model given by equation (1), the data-directed phase-locked loop in the Falconer article is governed by the first-order recursion $$\hat{\theta}_{n+1} = \hat{\theta}_n - \Delta Im[Q_n/\hat{A}_n] = \hat{\theta}_n - \Delta[\sin(\hat{\theta}_n - \theta_n) + \check{\nu}_n], \quad (3)$$

where Im denotes the imaginary part of a complex number, and where we define the angular error $$\psi_n = Im\frac{Q_n}{A_n} = \sin(\hat{\theta}_n - \theta_n) + \nu_n, \quad (4a)$$

and the demodulated noise samples $$V_n = \frac{W_n}{A_n} e^{-j\hat{\theta}_n} = \nu_n + j\nu_n \quad (4b)$$

with power $$\langle \nu_n^2 \rangle = \langle \nu_n^2 \rangle = \sigma_\nu^2 = \frac{\sigma_w^2}{2\langle |A_n|^2 \rangle} \quad (4c)$$

The demodulated noise samples will, in general, be correlated; however, if the phase estimator is relatively slowly varying (i.e., the tracking loop has a narrow bandwidth relative to the symbol rate), then for values of k such that the phase estimate remains essentially constant we have $$\langle V_n V_{n+k}^* \rangle = \left( \frac{W_n}{A_n} \cdot \frac{W_{n+k}^*}{A_{n+k}^*} e^{-j(\hat{\theta}_n - \hat{\theta}_{n+k})} \right) \quad (4d)$$

$$\approx \left( \frac{W_n}{A_n} \cdot \frac{W_{n+k}^*}{A_{n+k}^*} \right) = \left( \frac{|W_n|^2}{|A_n|^2} \delta_{n-k} \right).$$

Thus for (large) values of k which exceed the decorrelation time of the tracking loop, the phase estimates will be independent, and the output noise samples will also be uncorrelated. In the sequel some liberty is taken with the above reasoning and it is assumed that the noise samples $\{\check{\nu}_n\}$ are independent.

If the phase error is small (less than 20 degrees), then the phase increment is—to a good approximation—linearly proportional to the phase error plus noise, and the linearized loop equation is the first-order feedback structure $$\hat{\theta}_{n+1} = \hat{\theta}_n - [\Delta(\hat{\theta}_n - \theta_n) + v_n] \quad (5)$$

where the step-size, $\Delta$, represents a compromise between wideband and narrow-band operation. Referring to FIG. 4 in Falconer's article we note that, in general, there are two values of $\Delta$ which minimize the RMS residual phase error, thus an adaptive hill-climbing (gradient) algorithm would not be guaranteed to reach the optimum value.

A useful performance measure of any phase-jitter estimator is the angular mean-squared phase error (AMSE)

$$J = \overline{(\hat{\theta}_n - \theta_n)^2} \quad (6)$$

Owing to the unavailability of the statistics of the phase jitter sample, $\theta_n$, it is not possible to construct the best (conditional mean) estimate, $\hat{\theta}_n$, which minimizes $J$. Further, since $\theta_n$ is itself never perfectly known, it is also not convenient to synthesize an adaptive estimate which minimizes $J$. We turn our attention to the available quantity $$\tilde{J} = \langle (\psi_n)^2 \rangle = \langle (\hat{\theta}_n - \theta_n + \check{v}_n)^2 \rangle = \langle (\hat{\theta}_n - \theta_n)^2 \rangle + \sigma_v^2, \quad (7)$$

where the linearized (small error) approximation to the sine function is taken to be valid and the estimate, $\hat{\theta}_n$, is presumed to be independent of the current noise sample $V_n$. The procedure will be to propose an estimator which can be adaptively constructed to minimize $\tilde{J}$, and then the performance of this estimator, as measured by $J$, will be evaluated. Owing to the form of equation (7), minimization of either $J$ or $\tilde{J}$ with respect to $\hat{\theta}_n$ will produce the same estimator under the condition of vanishingly small noise. However, the added noise in the error observation, $\psi_n$, will affect the adaptation rate and steady-state properties of the estimator.

Now the form of the estimator will be first described, and then an indication of how the phase estimate can be constructed adaptively will be given.

The conventional first and second order phase-locked loops being recursive (feedback) structures have AMSEs which are generally not unimodal functions of their parameters and hence cannot be readily adapted—in real time—to the phase jitter actually present in the received signal. However, it will be demonstrated how a feed-forward (nonrecursive) estimator structure can be adapted via the same gradient-based techniques which are used to adjust the tap weights in an adaptive equalizer. Towards this goal, consideration is given to the (unrealizable) phase estimate, $$\hat{\theta}_n = \sum_{i=1}^{L} \alpha_i \theta_{n-i}, \; n = 1, 2, \ldots \quad (8)$$

composed of a linear combination of the past L values of the phase jitter. The estimate is not realizable since the quantities $\{\theta_m\}_{n-L}^{n-1}$ are not directly available; however, if they were available, then $\hat{\theta}_n$ is recognized as a one-step predictor of the phase jitter process. Note that $\hat{\theta}_n$ is a nonrecursive function, since the estimate depends only on past values of the jitter, and not past values of the estimate. This fact is important to the adaptive determination of $\hat{\theta}_n$. Using the readily available variables defined in the previous section, an approximation to equation (8) can be obtained from the relation $$\hat{\theta}_n = \sum_{i=1}^{L} \alpha_i \theta_{n-i} - \sum_{i=1}^{L} \alpha_i \psi_{n-i} \quad (9a)$$

$$\approx \sum_{i=1}^{L} \alpha_i \hat{\theta}_{n-i} - \sum_{i=1}^{L} \alpha_i (\hat{\theta}_{n-i} - \theta_{n-i} + \check{v}_{n-i})$$

$$= \sum_{i=1}^{L} \alpha_i (\theta_{n-i} - \check{v}_{n-i}), \quad (9b)$$

where the approximation is valid for small phase errors. For vanishingly small noise, the estimate constructed from equation (9) approaches the desired estimate, equation (8). Note that although equation (9a) suggests that the current estimate depends explicitly upon past values of the estimate, the relation of equation (9b) indicates that, for small errors, the estimate is solely a nonrecursive function of prior jitter and noise. The nonrecursive nature of the estimate is critical for the success of the adaptation procedure. Note that by adding $-\omega_c T$ to the right-hand side of equation (9), the demodulation function can be readily performed. In connection with the estimator represented by equation (9a), FIG. 1 provides an illustrative embodiment and the means of determining the $\alpha_i$ so as to adaptively minimize $\tilde{J}$. This minimization will be described subsequently. The representation equation (9a) is useful for synthesis considerations, while equation (9b) is preferred for analysis purposes. From equation (8) we note that the *transfer function* relating the estimator, $\hat{\theta}_n$, and the phase jitter, $\theta_n$, is the one-sided (causal) Fourier Series $$F(\omega) = \sum_{i=1}^{L} \alpha_i e^{-ji\omega T}, \quad (10)$$

where $j = \sqrt{-1}$. Using the estimator of equation (9b), we have $$\tilde{J} = \overline{\left( \left[ \sum_{i=1}^{L} \alpha_i (\theta_{n-i} - \check{v}_{n-i}) \right] - (\theta_n - v_n) \right)^2},$$

and when the jitter is a stationary random process with correlation function $$r_m = \langle \theta_n \theta_{n+m} \rangle \quad (11)$$

then $\tilde{J}$ is the quadratic form $$\tilde{J} = \sum_{i,j=1}^{L} \alpha_i \alpha_j R_{i-j} - 2 \sum_{i=1}^{L} \alpha_i r_i + R_0 \quad (12)$$

$$= \alpha' R \alpha - 2\alpha' r + R_0.$$

In equation (12), the prime denotes the transposed vector, $R$ is the Toeplitz angular-correlation matrix whose $mn^{th}$ entry is $R_{m-n} = r_{m-n} + \sigma_v^2 \delta_{m-n}$, $\alpha$ is the vector of estimator coefficients $[\alpha_i]_{i=1}^{L}$, and $r$ is the vector with elements $[r_i]_{i=1}^{L}$. Note that the noise influences the quadratic term in equation (12), but not the linear, in $\alpha$, term. Since the jitter correlation matrix is positive semidefinite, the matrix $R$ has an inverse, thus there is a unique optimum set of parameters, $\alpha_{opt}$, which are obtained by differentiation of equation (12). The optimum parameters satisfy the matrix relation $$R\alpha_{opt} = r, \quad (13)$$

or $$\alpha_{opt} = R^{-1} r. \tag{14}$$

It is worth emphasizing that the convex—or more importantly the unimodal—nature of J as a function of α will permit $\alpha_{opt}$ to be determined adaptively. As we have previously mentioned, this adaptive capability is critical, since R and r are not known at the receiver. The adaptive nature of the phase tracker is what distinguishes this technique from the conventional first and second-order data-directed phase locked loops.

The technique used to adaptively estimate the phase jitter is the estimated, or stochastic, gradient algorithm which is commonly used in adaptive equalization, such as Falconer's arrangement. Simply put, a steepest-descent algorithm is constructed from equation (7) and equation (9a), which learns the best value of α, by replacing the gradient of J with respect to α by the unbiased estimate, $$\frac{\partial [\psi_n^2]}{\partial \alpha}.$$

The estimate of $\alpha_{opt}$ at the $n^{th}$ iteration is denoted by $\alpha_n$, and is given by the algorithm $$\alpha_{n+1} = \alpha_n - \Delta \frac{\partial \psi_n^2}{\partial \alpha_n}. \tag{15}$$

which is evaluated either from equation (9a) as $$\alpha_{n+1} = \alpha_n - \Delta \psi_n (\hat{\theta}_n - \psi_n), \; n=1,2, \tag{16a}$$

or from equation (9b)

$$\alpha_{n+1} = \alpha_n - \Delta \psi_n (\theta_n + \check{v}_n), \; n=1,2, \tag{16b}$$

In equation (16), Δ is a positive quantity called the step size, $\psi_n$ is the phase-error vector with components $(\psi_{n-1}, \ldots \psi_{n-L})$, $\hat{\theta}$ is the vector of estimates having components $(\hat{\theta}_{n-1}, \ldots, \hat{\theta}_{n-L})$, and $\check{v}_n$ has components $(\check{v}_{n-1}, \ldots, \check{v}_{n-L})$. Equation (16a) is useful for the implementation of the adaptive algorithm shown in the illustrative embodiment while equation (16b) is appropriate for analyzing the algorithm's performance. If we define the "input" vector $$Z_n = \hat{\theta}_n - \psi_n = \theta_n + \check{v}_n, \tag{17a}$$

then the phase estimate used for demodulation is given by $$\hat{\theta}_n = \alpha'_n Z_n = \sum_{i=1}^{L} \alpha_i^{(n)} (\hat{\theta}_{n-1} - \psi_{n-i}) = \sum_{i=1}^{L} \alpha_i^{(n)} (\theta_{n-i} + v_{n-i}), \tag{17b}$$

where $[\alpha_i^{(n)}]_{i=1}^L$ are the components of $\alpha_n$. As is common in discussing adaptive algorithms, such as in equations (15)–(16), the highly correlated nature of successive increments $[Z_n]$ precludes an exact analysis of the algorithm's convergence. However, as with similar adaptive equalization algorithms, considerable insight can be obtained by assuming that the step size, Δ, is sufficiently small so that the time constant of the algorithm is long enough to imply significant averaging of the correction terms. It is empirically observed that with this choice of step size, the algorithm behaves as if the increments were independent vectors.

Figure 2:
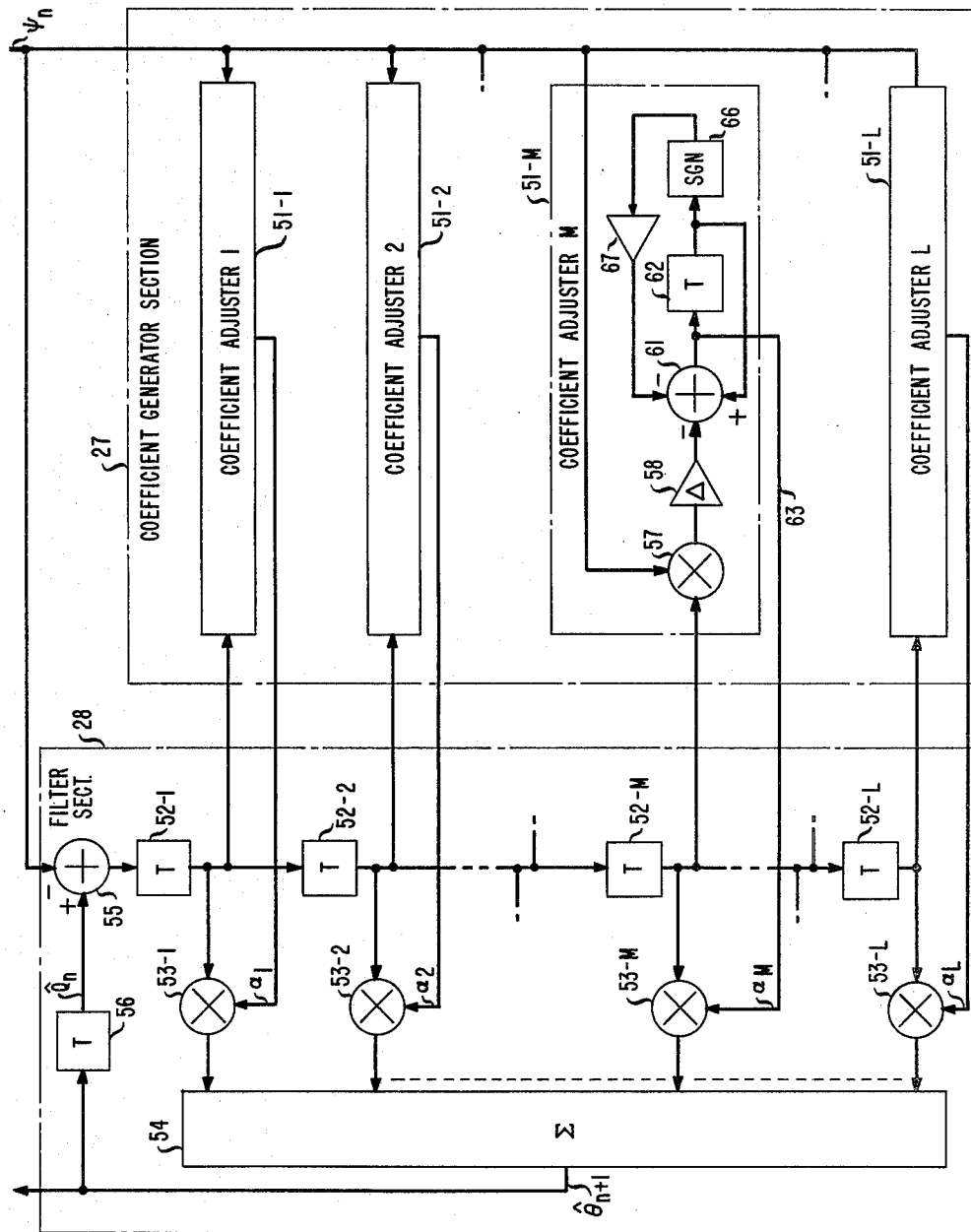
FIG. 2 illustrates the adaptive processing portion of the phase jitter compensation arrangement.

FIGS. 1 and 2, when juxtaposed according to FIG. 3, illustrate a data receiver utilizing the inventive principles to provide phase jitter compensation for a QAM data transmission signal. Of course, the inventive principles are readily applicable to other types of in-phase and quadrature modulated data transmission signals, and the actual structure of the receiver may be varied slightly to accommodate a particular application (e.g., an all digital front-end phase splitter using a variety of fractionally-spaced equalization techniques, may be utilized). At input 11, the received data signal or QAM passband signal is applied to phase splitter 12. Typically, this signal previously has been passed by a bandpass filter which is not shown.

Phase splitter 12 provides two replicas of the received analog signal termed the inphase signal on line 13 and the quadrature signal on line 14 which lags the inphase signal by 90 degrees. These signals may be regarded as a Hilbert Transform pair and are applied to sampler 16. For convenience, in the foregoing analytical discussion the QAM signal was expressed and processed as a complex number wherein the inphase and quadrature signals were considered respectively as real and imaginary components. The output of sampler 16 is converted into digital form by A/D converter 17 compatible with the operation of complex passband equalizer 18. It should be understood that equalizer 18 may take on any one of various conventional forms of equalizers known as either synchronous or fractionally-spaced equalizers and that the A/D converter can precede the phase splitter, provided that the appropriate sampling rate is utilized. As is well known in the art, these equalizers are adapted through a error signal remodulated up to passband from decision-directed recovery of the baseband signal. This is provided by virtue of slicer 19 and remodulator 21.

Since fractionally-spaced or nonsynchronous equalizers generally provide superior performance, they are preferred and, in which case sampler 16 operates at a multiple of the original sample rate used to form the QAM signal. For example, in a system using a T/2 fractionally-spaced equalizer the sampling interval, or the lapsed time between successive samples, is T/2 seconds. Alternatively, the received signal may be first digitized at a rate greater than twice the highest frequency component present in the QAM signal (typically 4/T) and then by utilizing a digital phase splitter provide an equivalent signal input to equalizer 18.

In either case, the equalized output is sampled again by sampler 22 at the symbol rate to provide a pair of signal outputs for complex multiplier 23 so that it can provide phase jitter compensation synchronously. The other inputs to the complex multiplier 23, or rotator, are the components of a synthesized modulated pair of error signals adaptively processed from the recovered baseband signal produced by the decision-directed operation of slicer 19. This processing initially starts with the operation of ψ calculator 26, then the circuitry of FIG. 2 wherein a coefficient generator section 27 and filter section 28 are provided, upmodulator 29, and sine/cosine lookup table 31. As a result, multiplier 23 not only compensates for the estimated phase jitter but also serves as a demodulator (i.e., multiplies the signal by $e^{-j\omega_c T}$) so that slicer 19 operates at the baseband level to provide the data signal outputs designated as $\hat{a}$ and $\hat{b}$ in FIG. 1. However, those skilled in the art may just use multiplier 23 to provide phase jitter compensation solely with the demodulation provided subsequently by appropriate means such as adding $-\omega_c T$ to the right-hand side of equation (9).

Now that an overview of the data receiver of FIGS. 1 and 2 has been provided further consideration will be directed to the internal circuitry of the individual components starting with $\psi$ calculator 26, where $\psi = \text{Im } Q/A$. The inputs to calculator 26 are the inputs to slicer 19 and the data outputs. Essentially, calculator 26 provides a square and divide operation wherein multiplier 41 computes the numerator term by multiplying the input signals of slicer 19 with the complex conjugate of the denominator term. Sign inverter 42 supplies the sign change for the imaginary or quadrature component. Accordingly, multiplier 41 extends the numerator signal terms to divider 43. The above operation provides an implementation to compute $\psi_n = \text{Im } Q_n/A_n = (a_n \check{q}_n - b_n q_n)/(a_n^2 + b_n^2)$, where $Q_n$ is written, as $Q_n = q_n + j\check{g}_n$ in terms of its in-phase $q_n$, and quadrature, $q_n$, components respectively. The data outputs are also applied to lookup table 44 which stores precomputed terms of the magnitude of the denominator term for divider 43. Divider 43 provides an output indicative of the angular error magnitude $\psi_n$ for sample n.

Both coefficient generator section 27 and filter section 28 utilize the angular error $\psi_n$ to provide adaptive phase tracking wherein frequency selective filtering isolates the phase jitter. Generator 27 includes a plurality of identical coefficient adjusters 51-1 to 51-L wherein an intermediate coefficient adjuster 51-m is shown in detail. Similarly, filter 28 includes a corresponding plurality of T interval delays 52-1 through 52-L. Delays 52-1 through 52-L are connected to form a tapped delay line and each delay is associated with a corresponding one of the adjusters 51-1 through 51-L. Accordingly, the output of each adjusters 51-1 to 51-L controls the gain and hence the weighting, of one of multipliers 53-1 through 53-L associated with the same tap of the delay line. The outputs of multipliers 53-1 through 53-L are applied to signal summer 54 to provide a weighted sum output. This output of summer 54 is extended to upmodulator 29 and also to combiner 55 via delay 56. Combiner 55 provides the difference between the angular error and weighted sum of previous estimates to provide a noisy estimate of the actual phase angle at the outputs of delays 52-1 through 52-L.

In adjuster 51-m, the coefficient or weighting factor of multiplier 53-m is initially set and then updated synchronously. This operation is provided by multiplier 57 whose output is the product of the angular error $\psi_n$ and the noisy estimate of the actual phase angle $\hat{\theta}_{n-m} - \psi_{n-m}$ produced by the output of delay unit 52-m. The product output is multiplied by the step size $\Delta$ of fixed constant multiplier 58 to provide the coefficient adjustment increments and decrements. Combiner 61 and delay 62 serves an accumulator which stores and updates the coefficient value, $\alpha_m$, extended to multiplier 53-m via line 63. Thus, the other input to multiplier 53-m provided by the output of delay 52-m, which is a noisy estimate of the actual phase angle, is weighted by the coefficient value of the multiplier for application to summer 54. Summer 54 collects and combines all of the outputs of multipliers 53-1 through 53-L to provide the weighted sum output that is adaptively synthesized by the cooperation between coefficient generator 27 and filter 28.

Coefficient leakage is utilized in adjuster 51-m to prevent coefficient blow-up. This may also be thought of as a rounding down technique to minimize the growth in coefficient values. Sign inverter 66 and prescribed factor multiplier 67 provide coefficient leakage within the accumulator provided by the cooperation between combiner 61 and delay 62. This technique is disclosed in a pending patent application entitled "Coefficient Tap Leakage for Fractionally-Spaced Equalizers", Ser. No. 16,495, filed on Mar. 1, 1979 in my name along with H. C. Meadors, Jr. and S. B. Weinstein.

Upmodulator 29 forms the modulated signal $e^{-j[\hat{\theta}_{n+1} + (n+1)\omega_c T]}$ and lookup table 31 provides the cosine and sine of $[\hat{\theta}_{n+1} + (n+1)\omega_c T]$. Thus 29 and 31 modulate the baseband output of summer 53 and convert the modulated weighted sum into real and imaginary components for complex multiplier 23. The cosine component from table 31 is applied to multipliers 71 and 72 of complex multiplier while the sinusoidal component is applied to multipliers 73 and 74. The outputs of multipliers 71 and 73 are algebraically combined in adder 75 to provide a demodulated and phase-jitter compensated inphase data signal for slicer 19. In similar fashion, adder 76 collects the outputs of multipliers 72 and 74 to provide the quadrature phase data signal for slicer 19 which is demodulated and phase jitter compensated.

It should be noted that according to the foregoing analytical analysis, the structure of the error function minimized by the inventive structure is unimodal, as is characteristic of nonrecursive filters. However, due to the fact that a delayed version of the output of summer 54 is presented via delay 56 as one input of signal combiner 55 whose output feeds the first unit of the line delay formed from delays 52-1 to 52-L, the adaptive structure is in reality recursive. As is well known to those skilled in the art, the common difficulty of recursive structures is that their associated error functions are not unimodal, and they cannot be conveniently adapted to an optimum minima. The typical parameters of a recursive structure include $\beta_i$ in addition to $\alpha_i$ in the expression $$\hat{\theta}_n = \sum_{i=1}^{L} \alpha_i \hat{\theta}_{n-i} + \sum_{i=1}^{N_2} \beta_i \psi_{n-i} \tag{18}$$

which leads to a corresponding mean-squared error that is not unimodal. In the special situations of the present invention, $\alpha_i = -\beta_i$ which via equation (9b), indicates the nonrecursive structure of the estimate and which allows the structure to be adapted in a unimodal fashion. The realization is via equation (9a) which is provided by feeding the delay line of units 52-1 to 52-L with the difference between the weighted sum output of summer 54 and the estimate of angular error.

What is claimed is:

1. A receiver for in-phase and quadrature modulated data on a carrier signal subject to phase perturbation wherein the receiver has a decision circuit (19) which provides the data output, apparatus for compensating the phase perturbation characterized in that multiplier means, (23) immediately precedes the decision circuit, for cancelling the phase perturbation and for demodulating the carrier signal using a synthesized signal;

calculating means (26), is connected to the input and output of the decision circuit, for deriving a baseband phase error; and adaptive means (27, 28), is connected to receive the phase error, for producing the synthesized signal for the multiplier means, the adaptive means has a signal synthesizing section (28) having a tapped delay line (52-1 to 52-L) and a coefficient updating section (27), the coefficient updating section including a plurality of units (51-1 to 51-L) each of which is associated with a signal tap of the delay line, the signal synthesizing section including a plurality of corresponding multipliers (53-1 to 53-L) each of which provides a factor times a selected noisy estimate of the actual phase, each unit of the coefficient updating section uses an accumulation of a predetermined portion of the product of the selected noisy estimate and the phase error to control the factor of the selected noisy estimate used by the corresponding multiplier (53-1 to 53-L), means for combining (54) the outputs of the multipliers (53-1 to 53-L) of the signal synthesizing section to produce a weighted sum, and modulating means (29) for producing the synthesized signal by superimposing the weighted sum on a carrier signal component whereby the multiplier means (23) cancels out the phase perturbation and coherently demodulates the carrier signal to provide a jitter free baseband data signal for the decision circuit.

2. The receiver of claim 1 wherein the adaptive means further includes means for feeding (55,56) the tapped delay line with the difference between the weighted sum and the phase error to provide successive selected noisy estimates for the units and the corresponding multipliers of the respective sections of the adaptive means.

3. The receiver of claim 2 wherein each unit includes leakage means (66,67) associated with the accumulation to prevent blow-up of its respective factor.

4. The receiver of claim 3 wherein each unit further includes multiplier means (57) having two inputs and an output, one input connected to receive the phase error and the other connected to receive the selected noisy estimate from the associated tap of the delay line, proportional means connected to receive the output and provide a predetermined proportional output for the accumulation of that unit.

5. A receiver for a data signal including data modulated in-phase and quadrature on a carrier signal subject to phase perturbations, said receiver including means for forming decisions as to said data in response to associated equalized samples of said data signal to provide a data output, characterized by means for deriving an angular error associated with each sample using the data output and input of said means for forming decisions, means for combining the angular error associated with each sample and a previously-formed estimate of the phase perturbation component of that sample to form an associated noisy phase estimate, and means for substantially cancelling the phase perturbation component from each sample in response to the weighted sum of the ones of said noisy phase estimates associated with predetermined previous ones of said samples.

6. The invention of claim 5 wherein said cancelling means includes means for forming said weighted sum by multiplying said ones of said noisy phase estimates by respective coefficients and summing the resulting products, and means for repetitively updating the values of each of said coefficients as a function of the respective noisy phase estimate and the angular error used to form same.

7. The invention of claim 5 wherein said cancelling means includes means for forming said weighted sum by multiplying said ones of said noisy phase estimates by associated coefficients and summing the resulting products, and means for repetitively combining each of said coefficients with a respective updating term, said updating term being equal to a selected fraction of the product of (a) the noisy estimate associated with said each coefficient and (b) the angular error used to form that noisy estimate.

* * * * *